(12) United States Patent
Thatcher et al.

(10) Patent No.: US 7,998,295 B2
(45) Date of Patent: Aug. 16, 2011

(54) HEATSHIELD HAVING STRAIN COMPLIANT MATRIX AND METHOD OF FORMING SAME

(75) Inventors: Conley S. Thatcher, Placentia, CA (US); John S. Jones, Anaheim, CA (US); Jeffrey D. Eichinger, Fountain Valley, CA (US); Brian L. Muench, Huntington Beach, CA (US); Tab H. Crooks, Dana Point, CA (US); Edwin B. Curry, La Habra, CA (US)

(73) Assignee: The Boeing Company, Chicago, IL (US)

( * ) Notice: Subject to any disclaimer, the term of this patent is extended or adjusted under 35 U.S.C. 154(b) by 160 days.

(21) Appl. No.: 12/138,616

(22) Filed: Jun. 13, 2008

(65) Prior Publication Data

US 2009/0311468 A1    Dec. 17, 2009

(51) Int. Cl.
| | |
|---|---|
| *B29C 65/00* | (2006.01) |
| *A63B 37/02* | (2006.01) |
| *A63B 39/00* | (2006.01) |
| *B32B 1/06* | (2006.01) |
| *B32B 3/12* | (2006.01) |
| *C09K 21/14* | (2006.01) |
| *B64G 1/10* | (2006.01) |
| *B64G 1/00* | (2006.01) |
| *B64G 1/40* | (2006.01) |
| *B64G 7/00* | (2006.01) |

(52) U.S. Cl. ............ 156/81; 156/80; 428/117; 523/179; 244/158.7; 244/159.1; 244/171.7; 244/121

(58) Field of Classification Search .................... 156/60, 156/71, 80, 81, 82, 83, 84, 85, 153, 154, 156/242, 245, 276, 285, 293, 294; 428/116, 428/117, 118, 357, 402; 264/28, 101, 102, 264/109, 115, 122, 219, 239, 241, 257, 259, 264/267, 268, 271.1, 299, 300, 319, 330, 264/331.11, 331.22; 523/179; 244/158.7, 244/159.1, 171.7, 171.8, 110 D, 121
See application file for complete search history.

(56) References Cited

U.S. PATENT DOCUMENTS

| | | | | | |
|---|---|---|---|---|---|
| 3,210,233 | A | * | 10/1965 | Kummer et al. | 428/117 |
| 3,296,153 | A | * | 1/1967 | Snogren | 428/117 |
| 3,697,630 | A | * | 10/1972 | Yoshino | 264/28 |
| 3,956,050 | A | * | 5/1976 | Dow et al. | 156/242 |
| 6,245,407 | B1 | * | 6/2001 | Wang et al. | 428/116 |
| 6,716,485 | B2 | | 4/2004 | Wong et al. | |
| 2009/0202780 | A1 | * | 8/2009 | Loszewski et al. | 428/117 |

FOREIGN PATENT DOCUMENTS

JP            01301329 A  * 12/1989
* cited by examiner

*Primary Examiner* — Philip C Tucker
*Assistant Examiner* — Brian R Slawski
(74) *Attorney, Agent, or Firm* — Harness, Dickey & Pierce, P.L.C.

(57) ABSTRACT

A method of forming a heat shield that involves thermally stabilizing a plurality of phenolic microspheres; mixing the thermally stabilized phenolic microspheres with a phenolic resin to form a phenolic ablative material; compressing the phenolic ablative material into a honeycomb core; and allowing the phenolic ablative material to cure.

13 Claims, 15 Drawing Sheets

FIG 10A
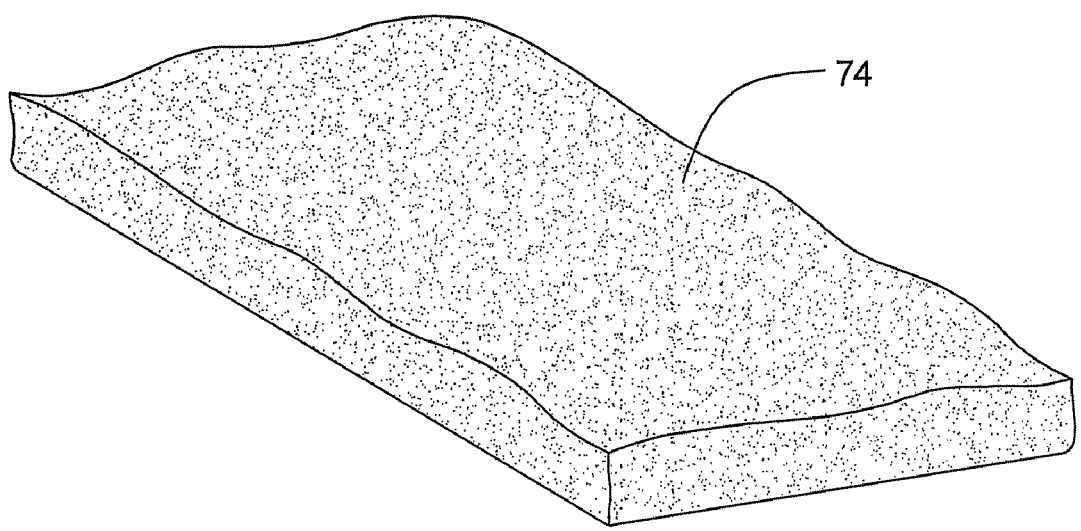
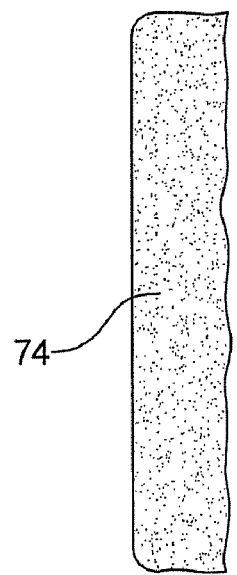
FIG 10B

FIG 17A
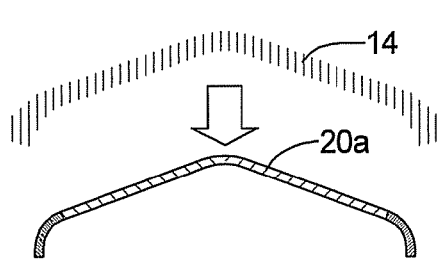
FIG 17B
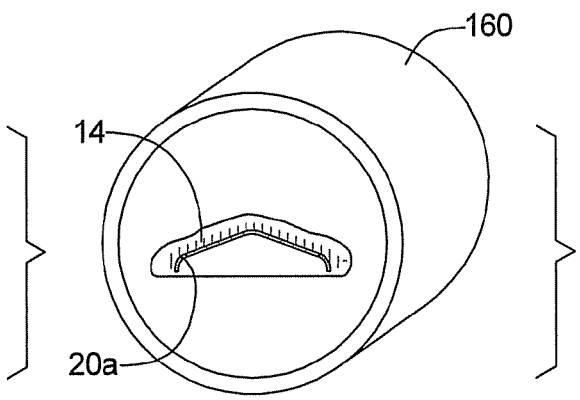
FIG 17C
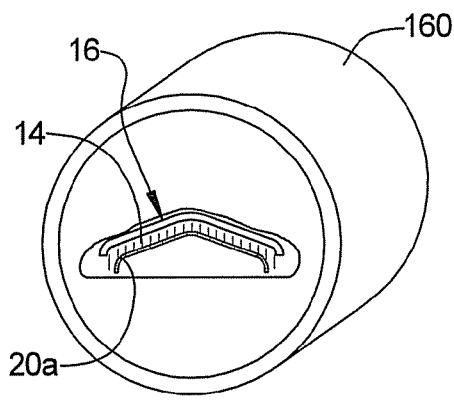
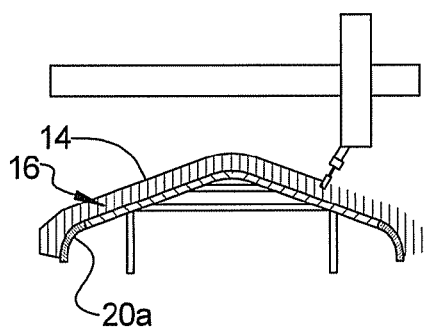
FIG 17D
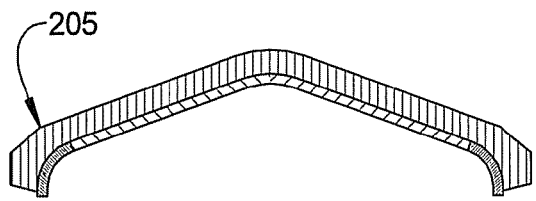
FIG 17E

`US 7,998,295 B2`

HEATSHIELD HAVING STRAIN COMPLIANT MATRIX AND METHOD OF FORMING SAME

FIELD

The present disclosure relates to heat shields, and more particularly to a heat shield constructed in part from a lightweight ablative material that is well suited for use on spacecraft and other aerospace vehicles.

BACKGROUND

The statements in this section merely provide background information related to the present disclosure and may not constitute prior art.

Spacecraft require safe, lightweight, affordable heat shields for protecting the spacecraft and its occupants during re-entry of the spacecraft into the Earth's atmosphere, or entry into a planet's atmosphere. Traditionally, the weight of the heat shield has been an important factor. The higher the weight of the heat shield panels used the lower the payload that the spacecraft will be able to carry.

Previously manufactured heat shields have typically been made from mixtures of silicone resins with fillers, from epoxy-novolac resins with fillers, from phenolic resins with fillers, from carbon-carbon composites with backside insulation, from quartz-phenolic composites with backside insulation, or from Phenolic Impregnated Carbon Ablator (PICA) material. However, existing solutions can often add significant weight to a spacecraft.

The cost of manufacturing previously developed heat shields for a spacecraft has also been an important concern for designers. Traditionally, the high cost of manufacturing heatshields for spacecraft, using complex processes, has contributed significantly to the overall cost of manufacture for a spacecraft.

SUMMARY

In one aspect the present disclosure is related to a method of forming a heat shield. The method may comprise: thermally stabilizing a plurality of phenolic microspheres; mixing the thermally stabilized microspheres with a phenolic resin to form a phenolic ablative material; compressing the phenolic ablative material into a honeycomb core; and curing the phenolic ablative material under controlled heat and pressure.

In another aspect the present disclosure relates to a method of forming a heat shield that may comprise: forming a phenolic ablative material; filling a rigid tool with the phenolic ablative material such that the material assumes a desired shape in accordance with a shape of an interior area of the tool; placing the tool in a vacuum while cooling the tool and the phenolic ablative material to freeze and dimensionally stabilize the phenolic ablative material to form a frozen phenolic ablative preform; removing the frozen phenolic ablative preform from the tool; and thawing and compressing the frozen phenolic ablative preform into a plurality of cells of a vented honeycomb core to form the heat shield.

In another aspect the present disclosure relates to a heat shield that may comprise: a honeycomb core having a plurality of cells; a phenolic ablative material compressed into said cells; and the phenolic ablative material including a plurality of thermally stabilized phenolic microspheres and a phenolic resin.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIGS. 10A and 10B show perspective views of the resulting ablative preform ready to be placed into the freezer for storage or to be pressed into a honeycomb core;

FIGS. 17A-17E illustrate a sequence of operations showing the overall approach for a monolithic heatshield that is formed by first attaching the honeycomb core to a spacecraft structure and then processing the assembly;

DETAILED DESCRIPTION

The following description is merely exemplary in nature and is not intended to limit the present disclosure, application, or uses.

Figure 1:
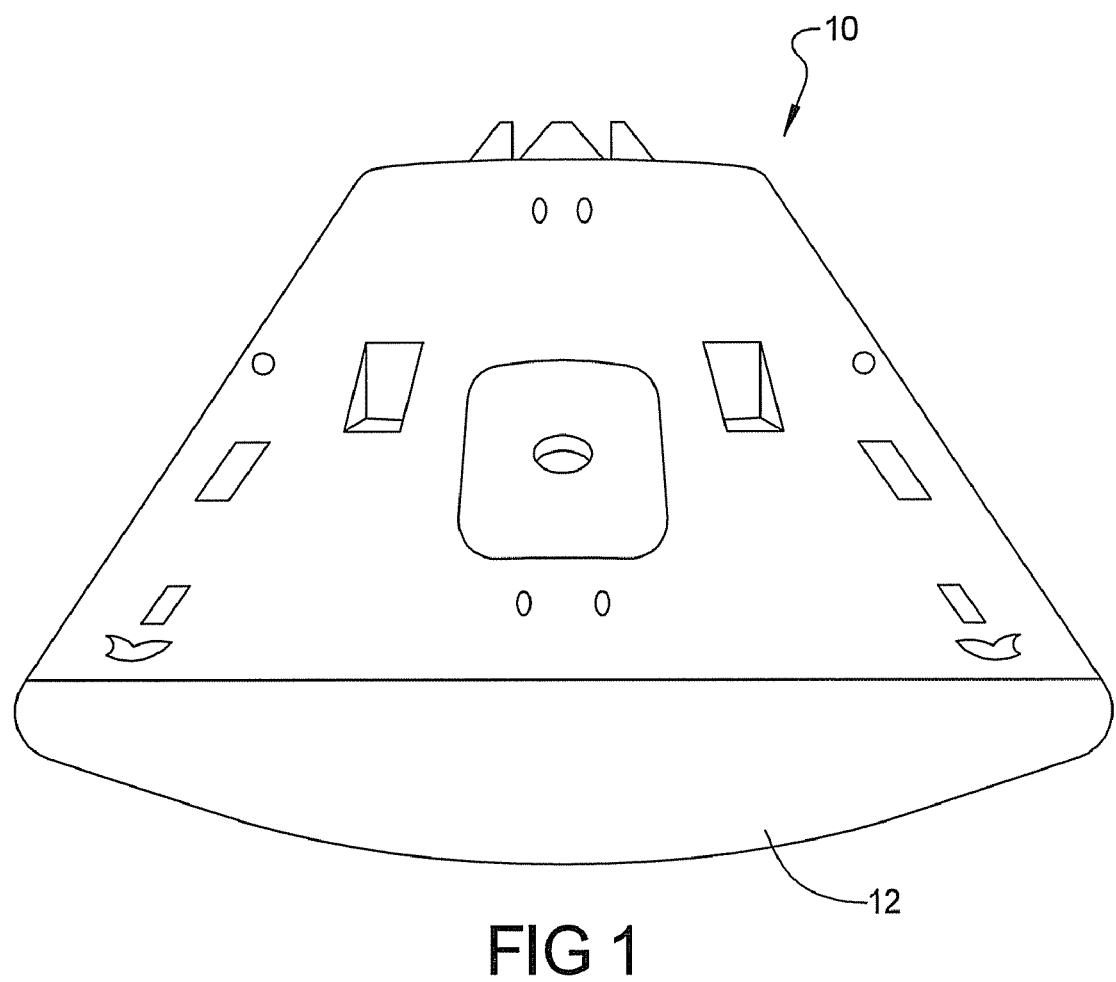
FIG. 1 is a side view of one exemplary spacecraft making use of a heatshield formed in accordance with the teachings of the present disclosure.

Referring to FIG. 1, an exemplary spacecraft 10 is shown incorporating a heatshield 12 in accordance with one embodiment of the present disclosure. The heat shield protects the spacecraft 10 and its occupants from the heat generated during reentry into the Earth's atmosphere, or during planetary entry. While the heatshield 12 is shown on a manned spacecraft, it will be appreciated that the heatshield 12 is well suited for use on a wide variety of other manned and unmanned space vehicles that are expected to encounter high temperatures on their exterior surfaces during travel through the Earth's, or a planetary atmosphere. The heatshield 12 is also potentially usable on other forms of vehicles, and possibly even on fixed (i.e., non-mobile) structures. The heat shield may find use on virtually any form of mobile airborne platform or ground based vehicle, or possibly even on marine vehicles.

Figure 2:
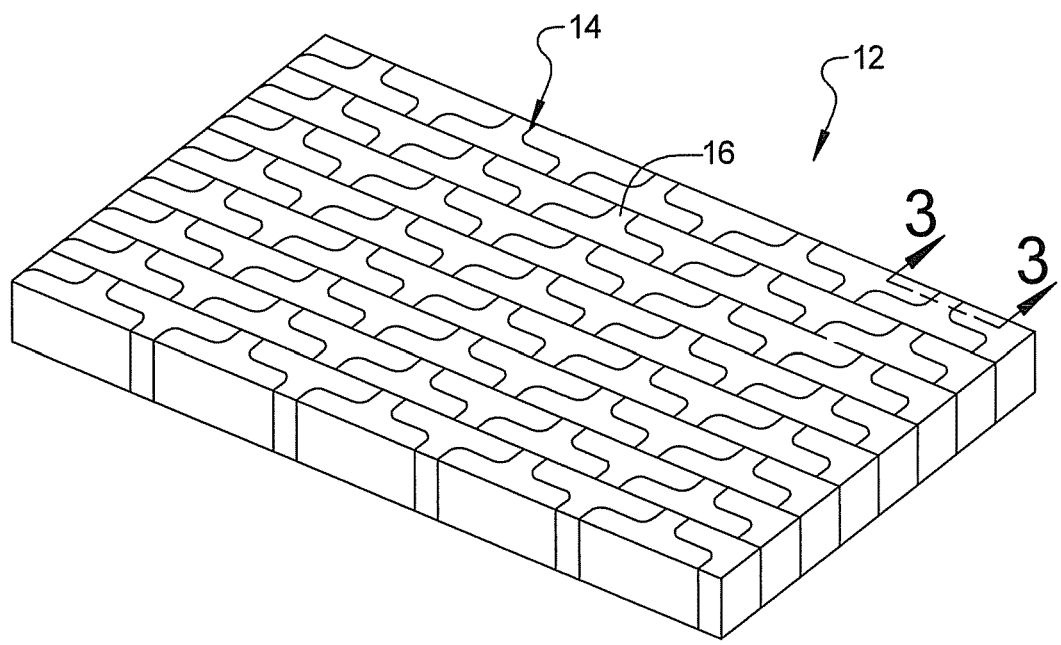
FIG. 2 is a perspective view of one section of the heatshield shown in FIG. 1.
Figure 3:
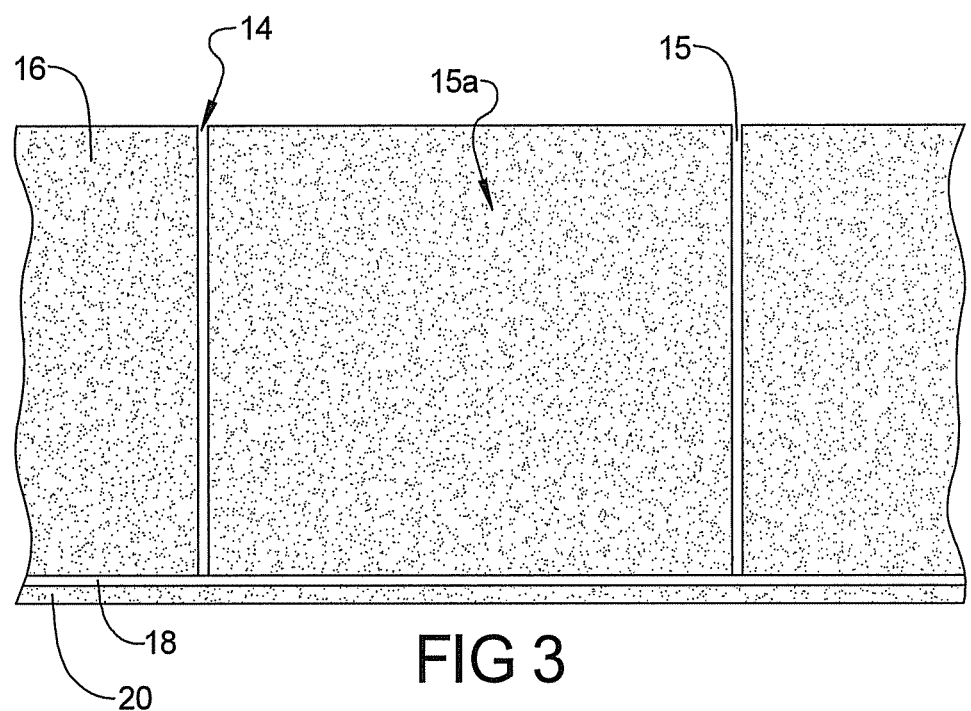
FIG. 3 is a cross section of the heatshield in accordance with section line 3-3 in FIG. 2.

Referring to FIGS. 2 and 3, the heatshield is shown in greater detail. The heatshield 12 includes a core 14, which in this example is a honeycomb core. For convenience the core 14 will be referred to throughout the following discussion as the "honeycomb core 14". The honeycomb core 14 has a plurality of intersecting wall portions 15 that form a plurality of cells 15a. An ablative material 16 is press fit into the cells 15a of the honeycomb core 14. In FIG. 3, the honeycomb core 14 may be secured via an adhesive layer 18 to a carrier structure 20.

The honeycomb core 14 may be formed from a fabric of well known fiberglass, for example Style 120 (E-glass), which is impregnated with a phenolic resin. The honeycomb core 14 may also be formed from a Leno weave fiberglass or carbon fiber fabric having an open weave construction. This enables the ablative material 16, when compressed into the cells 15a of the honeycomb core 14, to fill the cells 15a and become an integral portion of the wall structure of the honeycomb core 14. Prior to filling the cells 15a of the honeycomb core 14 with the ablative material 16, the honeycomb core 14 may be cleaned with a radio frequency (RF) generated plasma field so that its surfaces are thoroughly conditioned for the remaining manufacturing operations to which the honeycomb core 14 will be subjected. The plasma field cleaning treatment is a process that is commercially available. One such company performing this process is 4$^{th}$ State, Inc., of Belmont, Calif.

Figure 4:
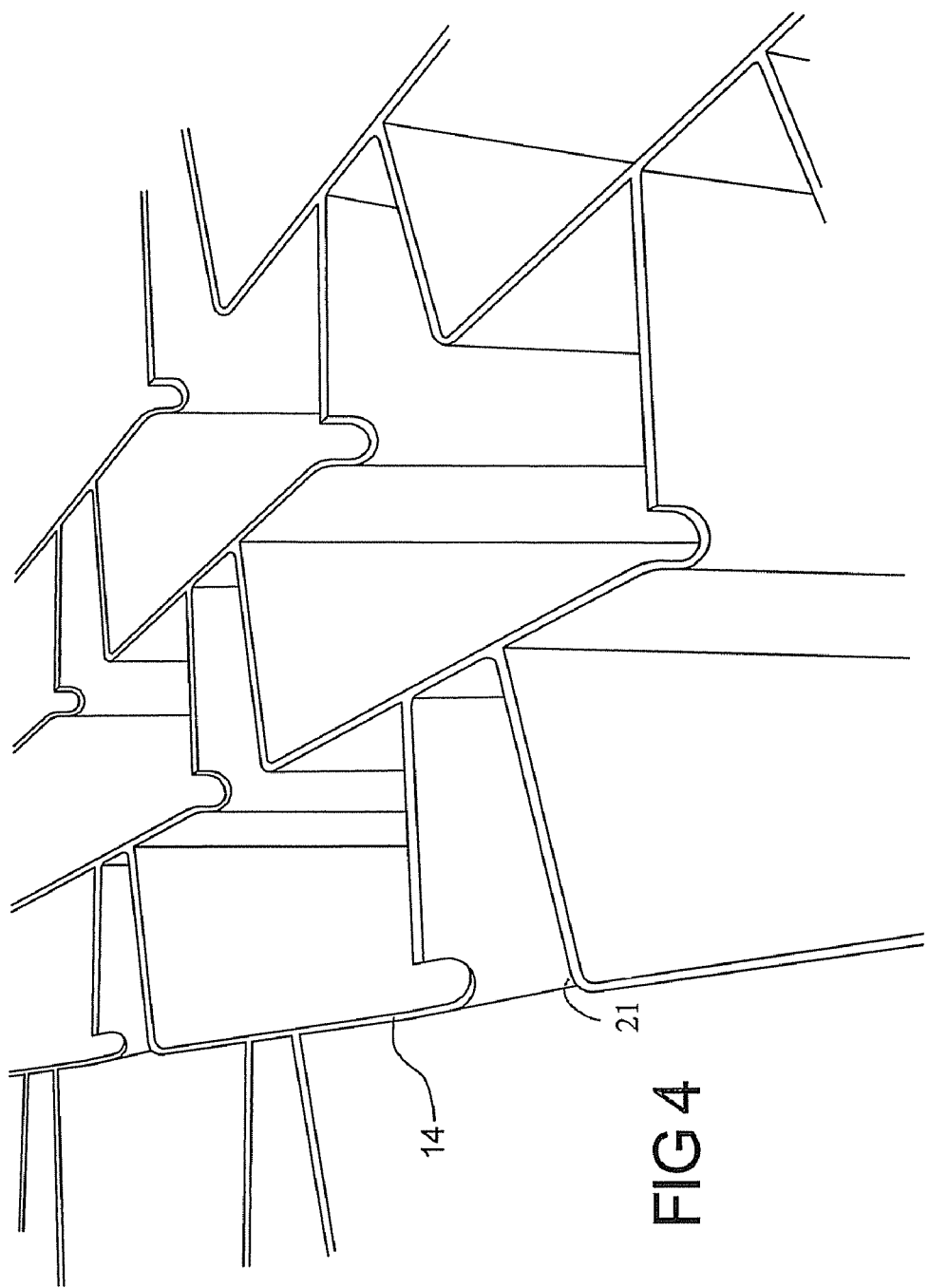
FIG. 4 shows the carrier panel side of a honeycomb panel that has had venting slots cut into the cell walls.

Referring to FIG. 4, following cleaning, and prior to filling the cells 15a with the ablative material 16, the walls 15 of the honeycomb core 14 are partially slotted, preferably using a diamond edged cutting tool, on the side of the honeycomb core 14 that will be bonded to the heat shield carrier structure 20. In FIG. 4 these slots are identified by reference numeral 21 and shown in detail on a piece of the honeycomb core 14. The slots 21 provide escape paths for ambient air that might otherwise create back pressure in the cells 15a during the subsequent honeycomb core 14 filling process, and for water and gases that evolve during a subsequently performed autoclave curing process. The air, water and gases are drawn off by a vacuum that is applied to a vacuum bag enclosing a preform that forms the ablative material 16, the honeycomb core 14, the carrier structure 20 and the tool. This process will be described in greater detail in the following paragraphs.

The carrier structure 20 may be formed as a multilayer structure from one or more metal sheets, or possibly even as a honeycomb structure having metal, for example titanium, face sheets. For convenience the carrier structure 20 has been drawn as a single metal layer in FIG. 3. The adhesive layer 18 may be formed by any suitable adhesive, but in one example HT-424 adhesive, which is an epoxy-phenolic structural film adhesive commercially available from Cytec Industries, Inc. of West Paterson, N.J., is used as the adhesive.

The ablative material 16 is uniquely formulated to form a lightweight, medium density, syntactic foam ablator compound. The ablative material 16 may comprise a mixture of phenolic resin, carbon fibers, silica ($SiO_2$ or Manville "Q") fibers, phenolic microspheres and silica microspheres. The silica fibers and carbon fibers are used to provide structural reinforcement to the ablative material 16 and to enhance the thermal and ablative performance. The silica microspheres and phenolic microspheres are used as density reducing fillers that also enhance the thermal and ablative performance of the ablative material 16. The phenolic resin, in one example, may be Plenco 11956 phenolic resin. The silica fibers may have a diameter of about 1.5 um. The carbon fibers may be milled fibers having a length of about 150 um and a diameter of about 7.4 um. One specific carbon fiber that is suitable for use is Asbury Graphite Mills AGM-94 milled carbon fibers. The silica microspheres may have a diameter of between about 20-250 um; and the phenolic microspheres may have a most common diameter of between about 20-100 um. In one implementation Phenocet BJO-0930 phenolic microspheres are used. It will be appreciated, however, that all of these dimensions may be varied to suit the needs of a particular application.

The use of Plenco 11956 resin is particularly advantageous because it is a single component, water based resole phenolic resin that does not require adding flammable solvents, toxic curing agents, or reactive diluents to the basic phenolic resin, as with epoxy-novolac or some other types of phenolic resins. Because it is a liquid at room temperature it does not have to be heated to be blended with fillers. Because pure phenolic resin is a better ablator than typical curing agents or reactive diluents, the absence of such curing agents and reactive diluents from the phenolic resin helps to provide the ablative material 16 with superior thermodynamic response characteristics. The lack of a curing agent also allows the freshly mixed ablative material 16 to have a longer room temperature working life, since rapid cure does not initiate until it is heated to above 150° F. The fresh resin has a relatively long storage life at 0° F. of typically about four months and the room temperature working life for the ablative material 16 is five days, unlike epoxy-novolac, or some other phenolic resin based ablators. These characteristics of Plenco 11956 resin, along with the use of frozen preforms, give the ablative material 16 the working time needed to apply it to large monolithic structures that can be cured in one piece. Some other phenolic resins or epoxy-novolac material systems either have short working lives that limit the area of the heat shield that can be processed at one time, or they require that the ablative material be hand injected into individual honeycomb cells using heated caulking guns.

Figure 5:
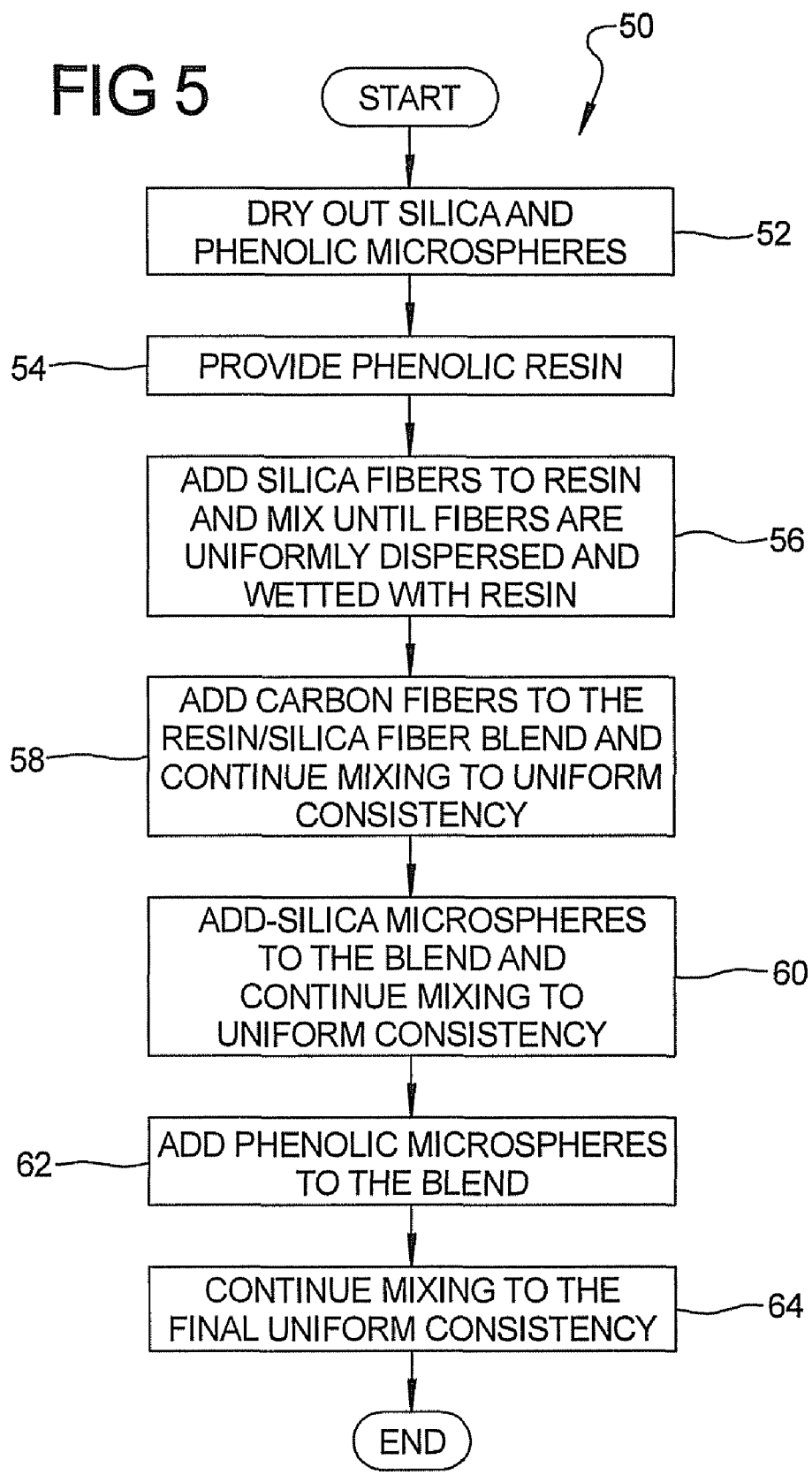
FIG. 5 is a flowchart of exemplary operations that may be performed to make the ablative material that is used in constructing the heatshield of FIG. 1.

Referring to flowchart 50 of FIG. 5, in forming the ablative material 16, it is preferred, but not absolutely essential, that the phenolic microspheres are dried out using a heated inert atmosphere before they are used to make the ablative material 16, as indicated at operation 52. This serves to remove any water and volatiles that may remain in the microspheres from the manufacturing process used to make them, and it stabilizes the state of cure of the phenolic resin that comprises the microspheres. The silica microspheres may also be dried by the same process to remove adsorbed water. It is also preferred that the various constituent materials used to form the ablative material 16 are added in a specific order to avoid clumping, achieve even wetting of the fibers and the microspheres by the phenolic resin, and to obtain uniform blending of all ingredients. The mixing may be done in a commercial bread mixer that imparts high shear forces to the blend but does not chop or mill the fibers and microspheres. To this end, at operation 54 a quantity of phenolic resin is provided, which as explained above is preferably Plenco 11956 phenolic resin. At operation 56 the silica fibers are added to the resin and mixed to achieve uniform dispersion and wetting by the resin. At operation 58 the carbon fibers are then added to the phenolic resin/silica fiber blend and the mixing is continued. At operation 60 the silica microspheres are added to the blend and the mixing is continued. At operation 62 the phenolic microspheres are added to the blend. At operation 64 the mixing is continued until the final uniform wetting and consistency are achieved. The sequence of adding ingredients and mixing is carried out over a time span of typically between about 23 minutes-30 minutes. In laboratory testing the ablative material 16 had a density (virgin) of between about 0.417 g/cm$^3$ to 0.497 g/cm$^3$ (26-31 lbm/ft$^3$); a thermal conductivity (virgin) at room temperature of 0.107 W/m-° K (0.62 Btu/hr-ft$^2$); an ablation onset temperature, in Nitrogen, of 396° C. (744° F.); a tensile strength through its thickness of 4.08 MPa (592 lb/in$^2$) and an effective heat of ablation of 69.9×10$^3$ KJ/Kg (at a plasma arcjet heat flux of 420 W/cm$^2$). At this point the ablative material 16 is ready to be manufactured into a preform.

Figure 6:
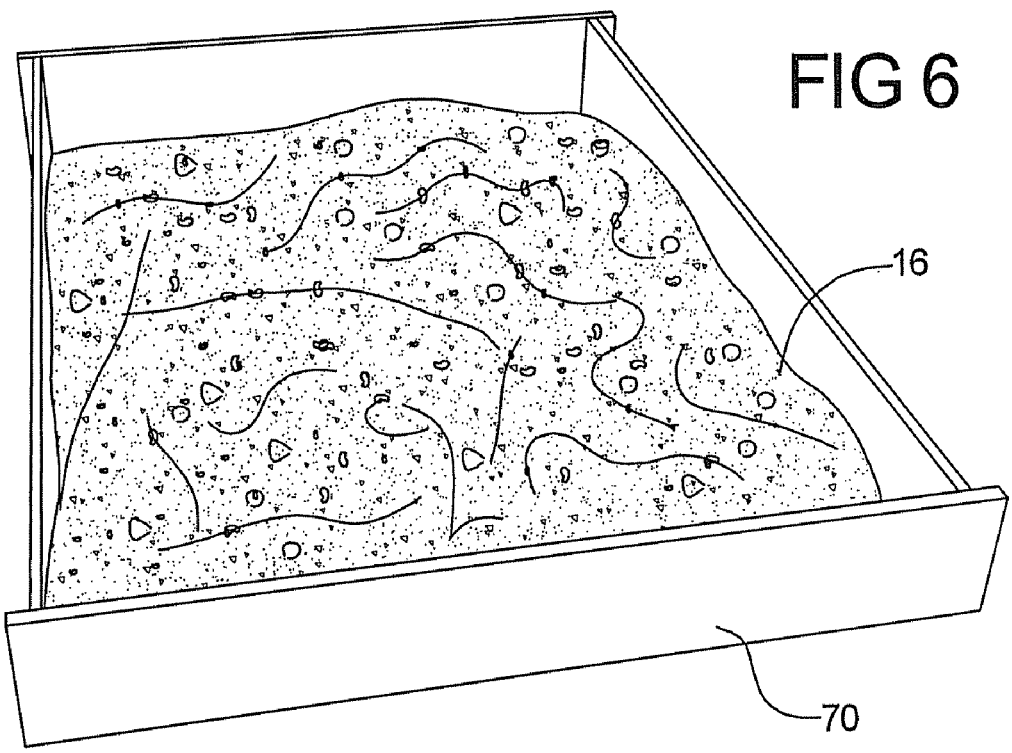
FIG. 6 is an illustration of a mold tool being filled with the ablative material.
Figure 7:
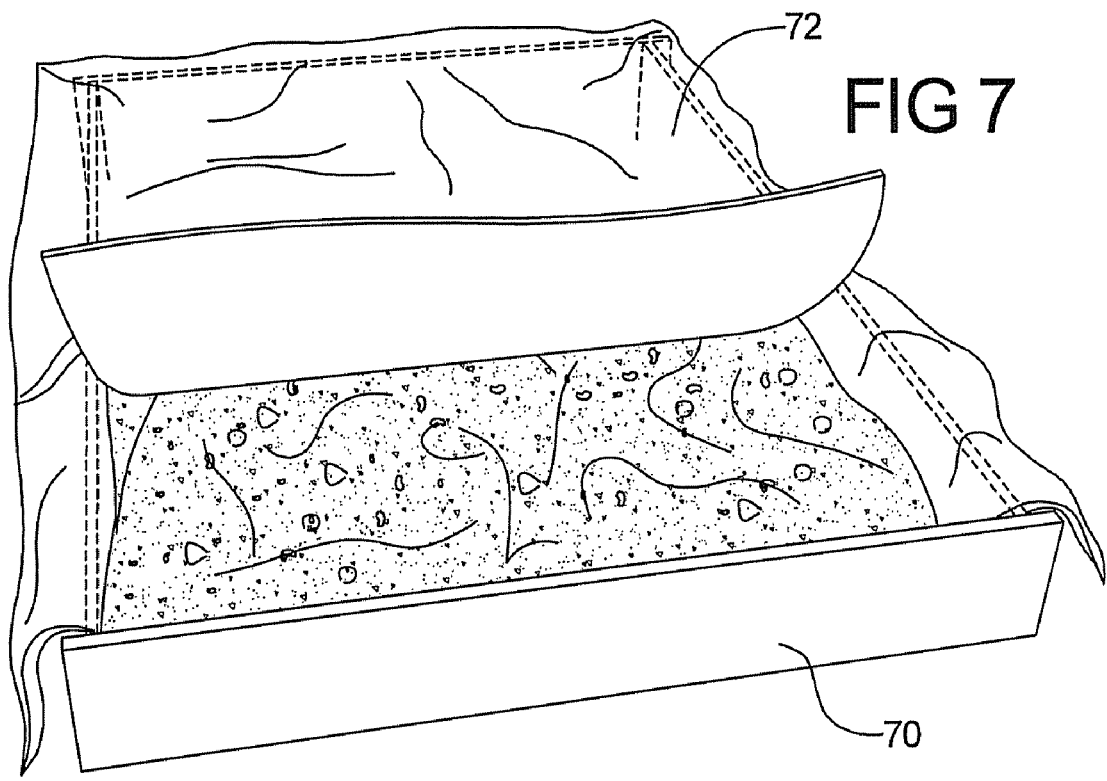
FIG. 7 shows a rubber caul sheet being placed over the BPA mix and a vacuum bag being secured over the filled mold tool of FIG. 5.
Figure 8:
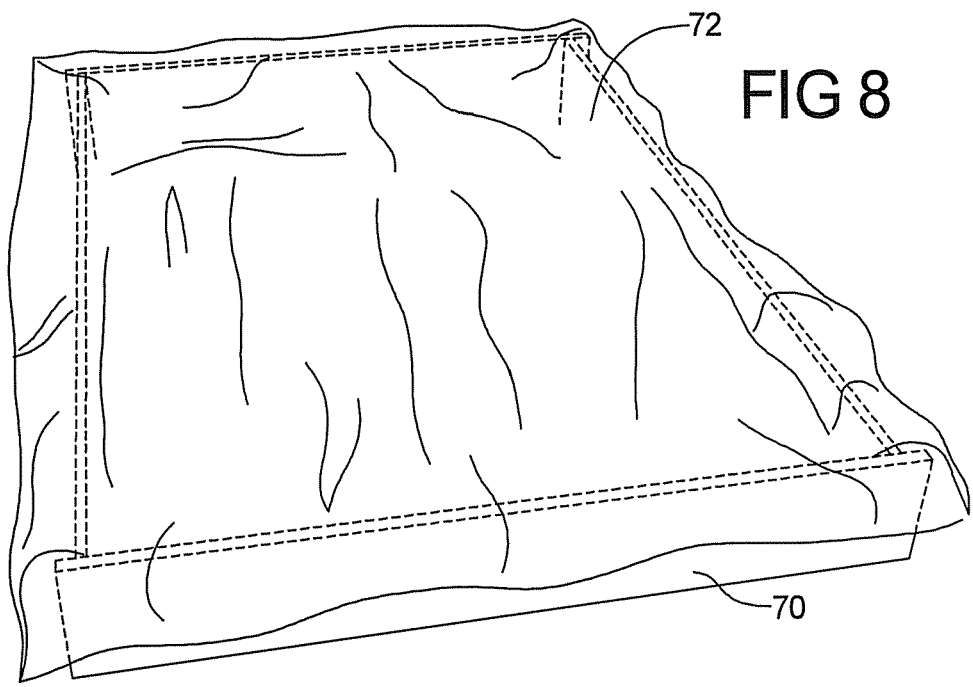
FIG. 8 shows the ablative material being debulked prior to being frozen.
Figure 9:
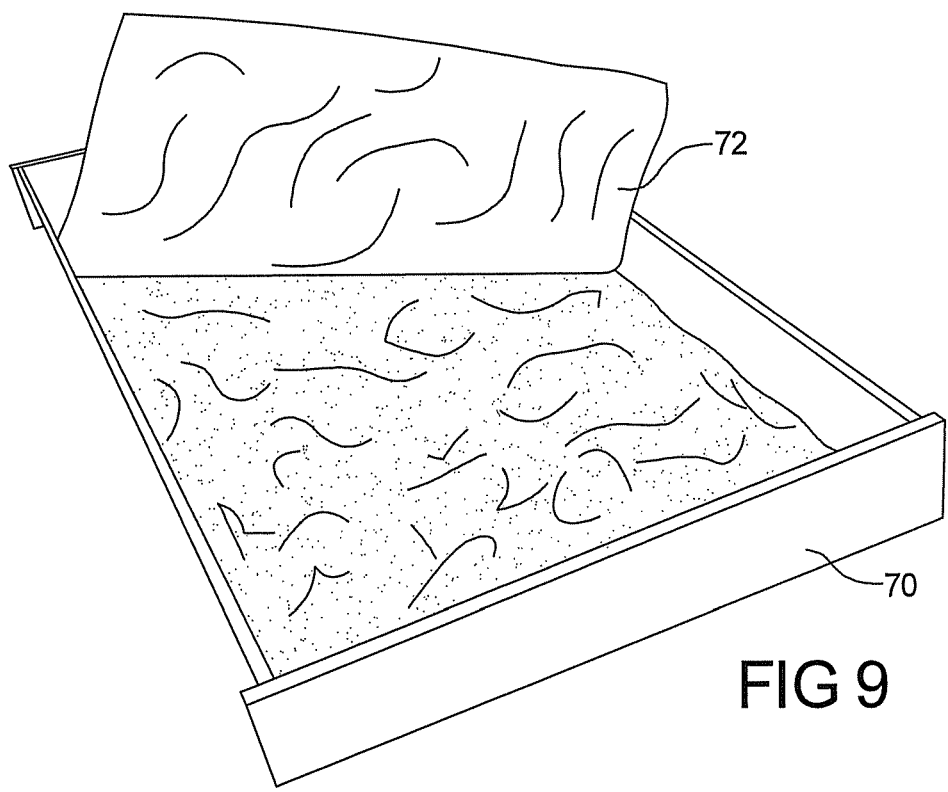
FIG. 9 shows the vacuum bagging material being removed from the mold tool and the frozen preform.

Referring to FIGS. 6-10, one method for forming a preform comprised of the ablative material 16 will be described. In FIG. 6 the ablative material 16 is used to fill a mold 70. The mold will have dimensions of length, width and thickness that correspond to the desired dimensions for the preform. In FIG. 7 mold 70 is vacuum bagged with suitable bagging materials 72 and the ablative material 16 is debulked, (i.e., compressed to consolidate the granules of ablative material and remove voids by means of a partial vacuum drawn on the vacuum bag). In FIG. 8 the mold 70 with the ablative material 16 is frozen at approximately −10° F. for about 4-6 hours. In FIG. 9 the bagging material 72 is removed from the mold. The frozen ablative material preform 74 is shown in FIGS. 10A and 10B. The preforms can be used immediately for filling honeycomb core 14, or they can be freezer stored up to 2 months for later use. For a large heatshield 12, that requires a plurality of preforms, the necessary quantity of preforms are made in advance and freezer stored until the time of final assembly.

Referring now to the flowchart 100 of FIG. 11 and the drawing of FIG. 12, a description of using the preform 74 to form the heat shield 12 will be described. At operation 102 the plasma cleaned honeycomb core 14 is slotted on the carrier structure side (as shown in FIG. 4), using a diamond edged cutting tool, to thus form the slots 21. At operation 104 the carrier structure 20 is bonded to the honeycomb core 14. At operation 106 the honeycomb core 14 with the carrier structure 20 bonded thereto is placed in a mold tool 75 sized approximately to the dimension of the honeycomb core and its carrier structure. At operation 108 the frozen preform 74 is placed over an upper surface of the honeycomb core 14, that being the surface opposite to that which the carrier structure 20 is secured to. The entire assembly is covered with vacuum bagging materials 77 as indicated at operation 110. The assembly ready to be autoclave cured is shown in simplified form in FIG. 12. The core slots 21 that provide venting during filling and cure are shown in FIG. 12 at the intersection of the honeycomb core 14 and the carrier structure 20.

Figure 11:
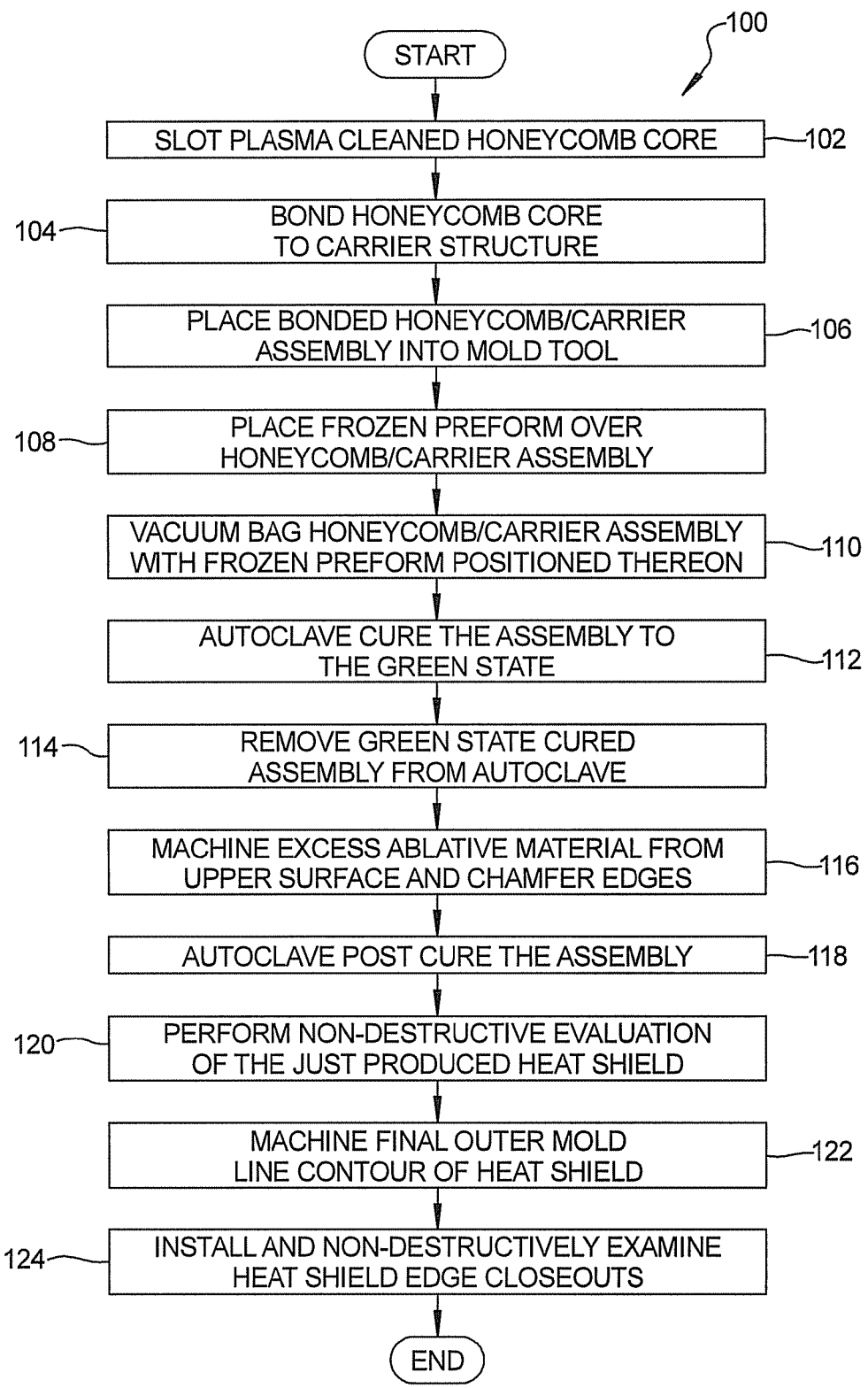
FIG. 11 is a flowchart illustrating exemplary operations in forming the heatshield of the present disclosure.
Figure 12:
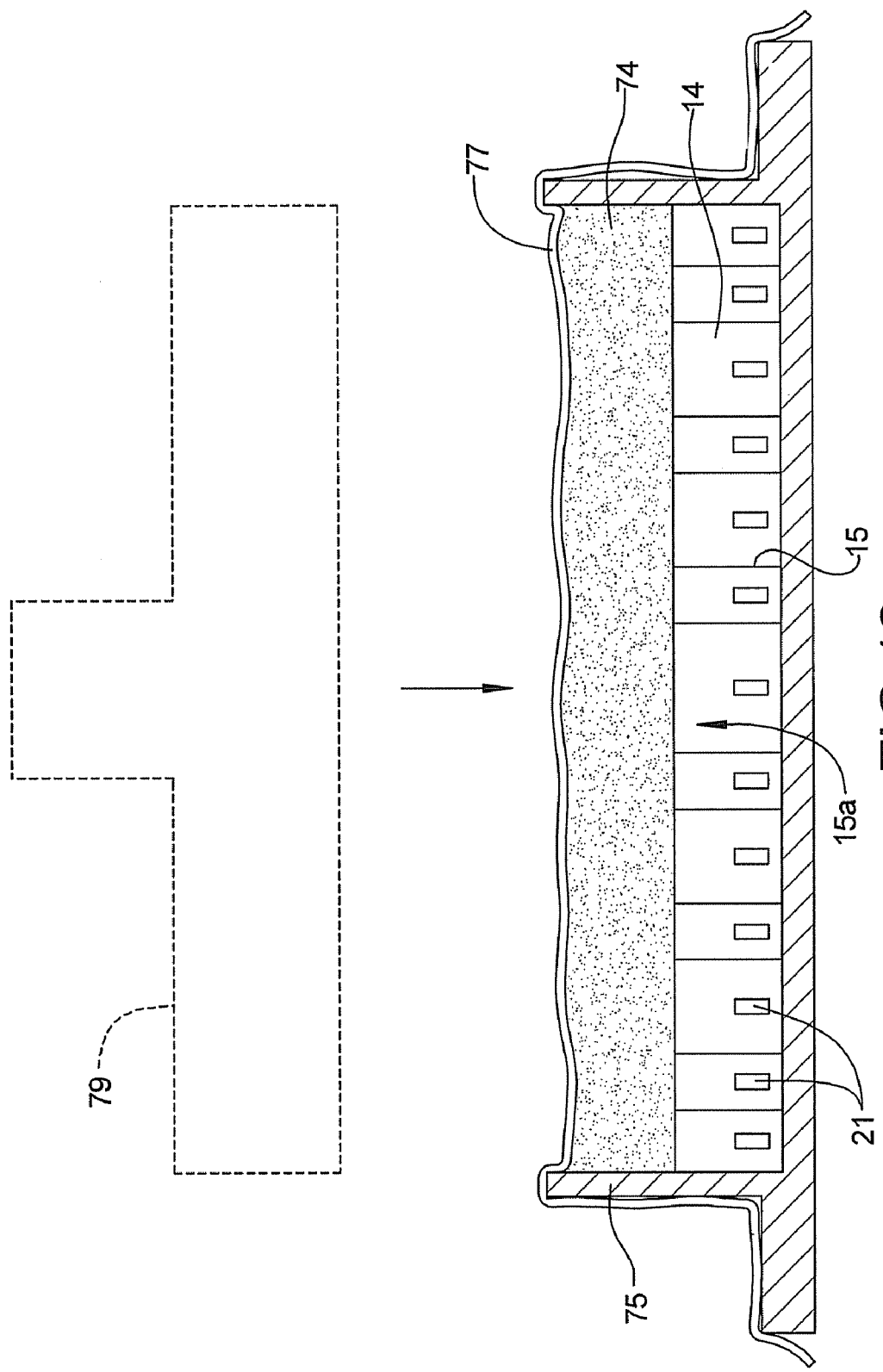
FIG. 12 is a partial side cross sectional view of the ablative preform positioned over the honeycomb core, and with the preform/honeycomb core assembly positioned within a mold tool that is enclosed within a vacuum bag ready for placing into the autoclave.
Figure 13:
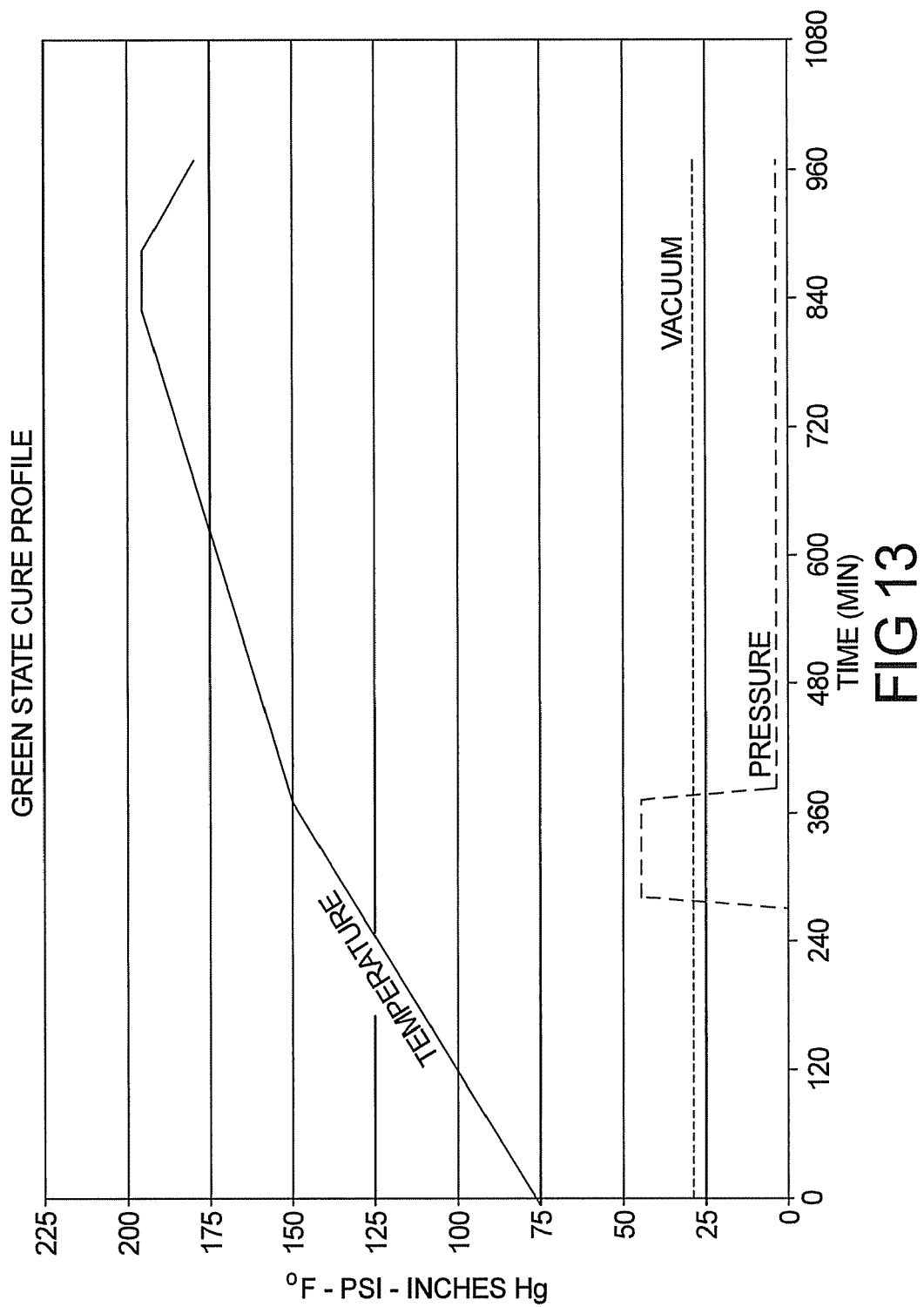
FIG. 13 is an exemplary graph of the pressure and heat profiles used during green state curing of the assembly shown in FIG. 12.

Referring further to FIG. 11, the assembly of FIG. 12 is then autoclaved cured to the "green state", i.e. partially cured, as indicated at operation 112. Exemplary temperatures and pressures that may be used during the autoclave cure cycle are illustrated in the graph shown in FIG. 13. During the autoclave curing cycle the preform 74 is thawed and squeezed into the cells 15a of the honeycomb core 14 under pressure until the cells 15a are completely filled with the material of the preform 74, to thus form the heat shield 12. Rather than by autoclave processing, the preform 74 could also be compressed into the cells 15a of the honeycomb core 14 by a mechanical press, as indicated by dashed lines 79.

Figure 14:
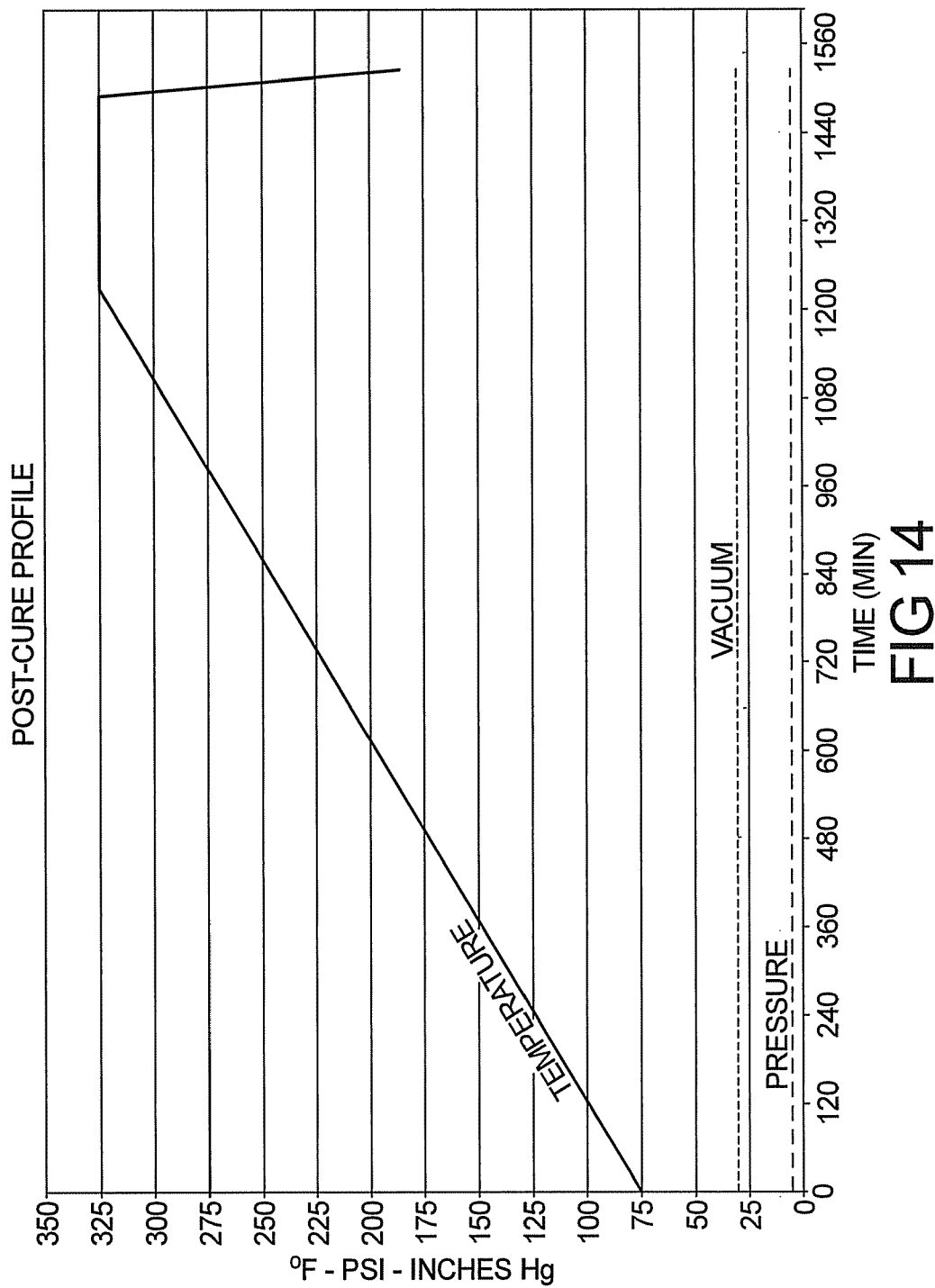
FIG. 14 is an exemplary graph of the pressure and heat profiles used during post curing of the assembly shown in FIG. 12.

Once the green state cure operation is complete, the heat shield 12 is removed from the mold tool 75 (or the mold tool disassembled), as indicated at operation 114. At operation 116 excess material from the preform 74 that extends above the honeycomb core 14 may be removed by machining or other means, and the edges, or periphery, of the heatshield may be beveled to reduce the effect of shrinkage stresses during the subsequent postcure operation. At operation 118 the heatshield 12 is returned to the autoclave for postcure to the final cure state of the ablative material 16. Exemplary temperatures and pressures that may be used during the autoclave postcure cycle are illustrated in the graph shown in FIG. 14.

Figure 15:
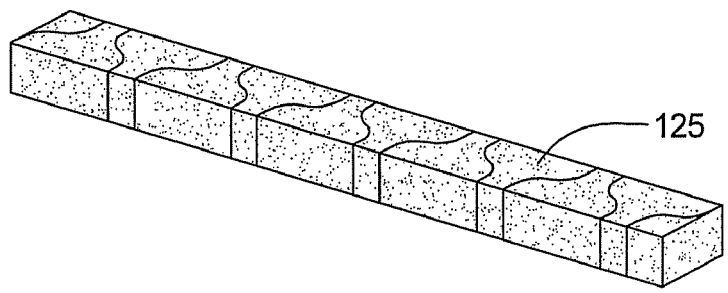
FIG. 15 is a perspective view of an exemplary closeout component that may be secured to a perimeter edge of the heatshield to close it.

At operation 120 non-destructive examination of the heat shield 12 by x-ray and ultrasonic methods may be performed to: 1) verify the integrity of the adhesive bonds between the cured ablative material 16, the honeycomb core 14, and the carrier structure 20; 2) verify that the honeycomb cells are all filled completely, top to bottom, (i.e. the cell fill is free of voids); and 3) verify that there are no internal cracks in the cured ablative material 16. At operation 122 the final outer mold line (OML) contour of the heat shield may be machined, if needed, to provide a particular, desired contour. At operation 124, edge closeouts 125, one of which is shown in FIG. 15, that have been manufactured in the same manner as the heat shield 12 described above, may be secured such as by an adhesive to the carrier structure 20 to close off the exposed peripheral edges of the heatshield 12. The edge closeouts 125 may also be adhesively bonded to the edges of the main portion of the heat shield 12, or they may be bonded only to the carrier structure 20 and the gaps between the closeouts 125 and the main portion of the heat shield 12 subsequently filled with a room temperature curing silicone elastomer. Also at operation 124 the edge closeouts 125 of the heat shield 12 are all non-destructively inspected.

Figure 16:
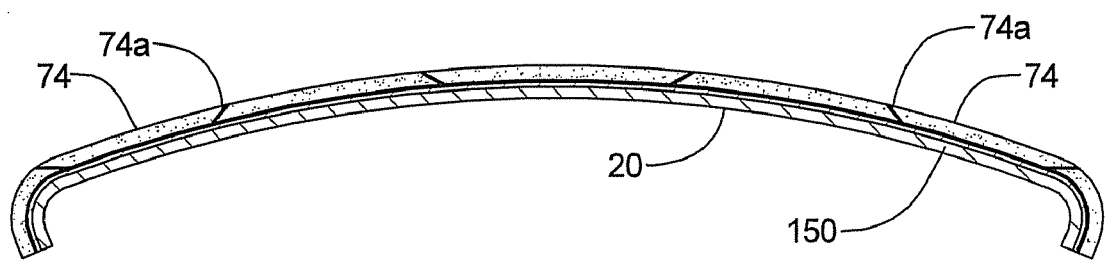
FIG. 16 is a simplified side view showing how a monolithic heatshield may be formed using a plurality of sections of the heat shield described in the present disclosure.

Referring to FIG. 16, when making a monolithic non-planar heat shield for the spacecraft 10 shown in FIG. 1, a slotted honeycomb cone 150, similar or identical in construction to honeycomb core 14, may be formed with the desired moldline needed to enable attachment of a finished heat shield to the outer surface of the spacecraft. In this regard a plurality of ablative preforms 74 may be cut to desired shapes and layed onto the honeycomb core 150, which has been secured with an adhesive layer 18 to the carrier structure 20, and then the entire assembly vacuum bagged and cured in an autoclave as a single piece assembly. Each of the preforms 74 may have chamfered edges 74a to help interlock with adjacently placed preforms. An alternative for making a monolithic, non-planar heat shield as shown in FIG. 16 is to temporarily secure the slotted honeycomb core 150 to a male tool that matches the outer mold line contour of the spacecraft structure, then layup, vacuum bag, press into the core, and autoclave cure the ablative material 16 of the ablative preform 74 in the manner described above to produce a monolithic ablator. The monolithic ablator is then removed from the tool, the inner mold line contour is verified or machined, and the single piece is secured by an adhesive to the spacecraft structure outer mold line.

In one variation of producing the ablative material 16, the material 16 may be forced through a mesh screen, for example a 100 mesh screen, (meaning a stainless steel wire screen with 100 openings per inch that are about 0.005 inches on a side), to form a pelletized ablative material. The pelletized ablative material may then be distributed over the cells of the honeycomb core 14 to completely fill the cells prior to vacuum bagging of the honeycomb core.

Figure 18A:
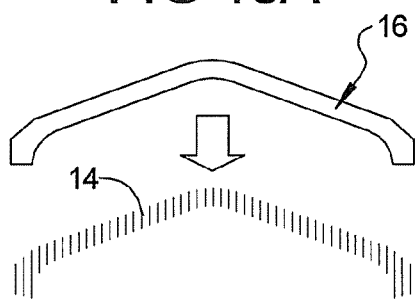
FIGS. 18A-18F illustrate a sequence of operations for an alternate approach for constructing a monolithic heatshield that is formed by filling the honeycomb core on a tool that matches the heatshield structure, then processing, machining and attaching the ablative panel to the spacecraft in one piece.
Figure 18B:
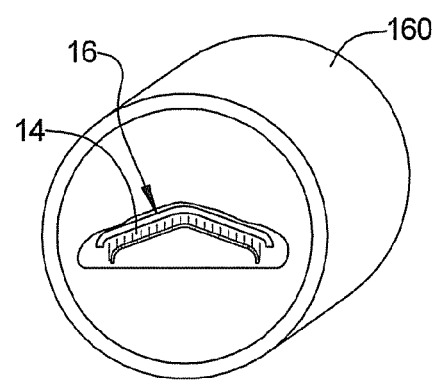
Figure 18C:
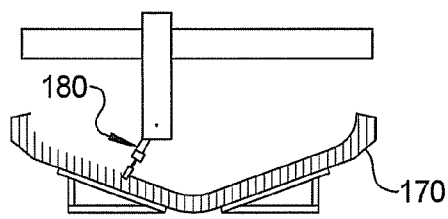
Figure 18D:
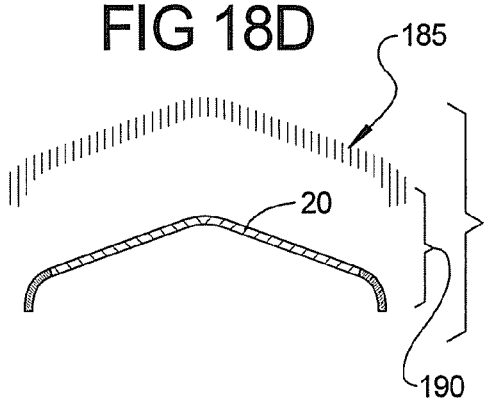
Figure 18E:
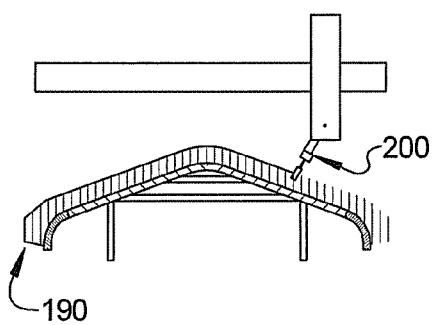
Figure 18F:
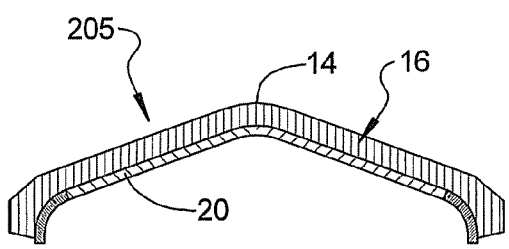

The methodology of the present disclosure thus provides a means for filling large areas of a honeycomb core structure at one time rather than filling each cell individually, or by filling tile size pieces of honeycomb core by machine or hand pressing material into both sides of the core, followed by curing and then machining to a finished shape for installation. This approach makes possible at least three major options for heat shield assembly. The first option is highly advantageous and involves pre-bonding the unfilled honeycomb core to the exterior of a spacecraft using an existing adhesive that has been certified for manned spaceflight. Thus, the present disclosure eliminates the need for the development and certification of a new attachment design for attaching the heatshield to a spacecraft using gore segments or tiles. The second advantageous option that the methodology discussed herein makes possible is that when a particular spacecraft design does not allow for processing the heatshield on the spacecraft, a single piece monolithic ablator assembly may be made on the side and then secured to the spacecraft by an adhesive in one operation. The third option, which has advantages for some spacecraft as well as for hypersonic aircraft, ground vehicles and stationary applications, is to make large preformed cured billets that are subsequently machined into panels, gores or large and small tiles. Options 1 and 2 are illustrated and compared in FIGS. 17A-17E and 18A-18F, respectively. In FIG. 17A the honeycomb core 14 is first bonded to the carrier structure 20a that will ultimately form a portion of a spacecraft. In FIG. 17B the assembled honeycomb core 14 and carrier structure 20 are then cured in an autoclave 160. The honeycomb core 14 may then be filled with the ablative material 16 and then cured in the autoclave 160 (FIG. 17C). The outer mold line (OML) of the resulting cured assembly of FIG. 17C may then be machined to the desired shape and/or contour, as indicated in FIG. 17D. The resulting product is shown in FIG. 17E. In FIGS. 18A-18F, option two described above is illustrated. The ablative material 16 is first compressed into the honeycomb core 14. In FIG. 18B, the assembly shown in FIG. 18A is then autoclave cured in the autoclave 160 to form assembly 170. In FIG. 18C a machine tool 180 is used to machine the inner mold line (IML) of the cured assembly 170 to form machined assembly 185, which is shown in FIG. 18D. In FIG. 18D the machined assembly 185 is then bonded to the carrier structure 20 to form assembly 190. In FIG. 18E the outer mold line (OML) of the assembly 190 is machined with a machine tool 200. The finished product 205 is shown in FIG. 18F.

Figure 19:
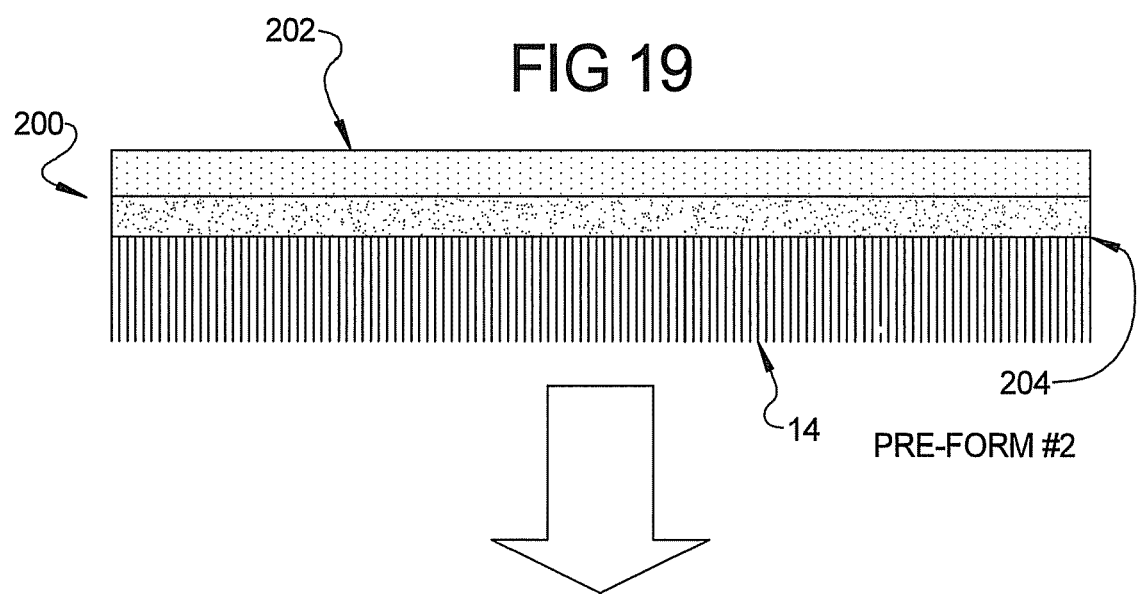
FIG. 19 illustrates another embodiment of the heat shield in which two preforms are used that have different constituencies of microballoons, to thus provide two layers of ablative material having different densities.
Figure 20:
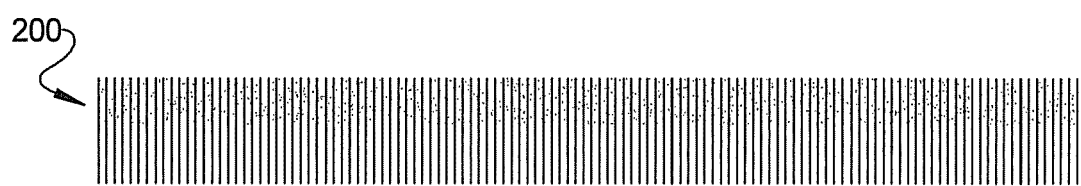
FIG. 20 shows the heat shield of FIG. 19 after the two preforms are compressed into the honeycomb core.

Referring to FIGS. 19 and 20, a heat shield 200 is shown in accordance with another embodiment of the present disclosure. The heat shield 200 involves using two or more frozen preforms 202 and 204, which are each similar in construction to preform 74, but where the two preforms have differing amounts (and possibly different types) of microspheres so that the two preforms 202,204 have differing densities. In this manner an ablative material may be produced that has a controlled density gradient through its overall thickness. This is beneficial because it is desirable to have a higher density material at the outer layer, where ablation occurs, but a lower density material at the inner layer in order to minimize thermal conductivity and overall weight. The challenge of attaching the individual preforms 202 and 204 to each other in a manner such that the bond therebetween can survive high temperatures is overcome by incorporating the density gradient in a single type of ablative material, and co-curing the two preforms 202,204 so that there is essentially no joint or seam between the two preforms in the finished product. The finished product is shown in FIG. 20.

The heat shield 12 manufactured as described above is lighter than existing heat shields made from pre-existing approaches because of the greater mass efficiency of the ablator composition. The heat shield 12 also uses safe, non-toxic materials. The heat shield 12 allows two options for a monolithic heatshield design to be constructed that can be made in accordance with less complex manufacturing procedures traditionally employed in the manufacture of such heat shields. These benefits also help to reduce the cost of the heat shield 12 as well as the time needed to manufacture it. In particular, curing the ablative material 16 after it has been attached to the honeycomb/carrier structure avoids the need to form or machine a cured ablative material to match the contour of a heatshield carrier structure, which must take into account machining errors and any variations in each specific carrier structure piece.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of forming a heat shield, comprising:
   providing a plurality of phenolic microspheres;
   mixing said phenolic microspheres with a phenolic resin to form a phenolic ablative material;
   forming a honeycomb core having a plurality of intersecting walls that form a plurality of cells arranged in rows and columns;
   further forming the honeycomb core such that each cell has a slot formed at an edge surface along a first side of the honeycomb core, to allow the escape of ambient air within each of the cells when the edge surface of the honeycomb core is placed against a carrier structure to which the honeycomb core is being permanently bonded, and the cells are being filled with the ablative material from a second side of the honeycomb core opposite to the first side;
   compressing said phenolic ablative material into the honeycomb core from the second side of the honeycomb core while the second side of the honeycomb core is secured to the carrier structure; and
   allowing the phenolic ablative material to cure.

2. The method of claim 1, wherein mixing said phenolic microspheres with a phenolic resin comprises mixing thermally stabilized phenolic microspheres with at least one of:
   a plurality of silica microspheres;
   silica fibers; and
   lengths of carbon fiber.

3. The method of claim 1, wherein providing said plurality of phenolic microspheres comprises drying said phenolic microspheres to remove water and volatiles therefrom, to thus thermally stabilize said phenolic microspheres.

4. The method of claim 1, wherein said phenolic ablative material is forced through a mesh screen to create a pelletized phenolic ablative material before compressing said pelletized phenolic ablative material into said honeycomb core.

5. The method of claim 4, further comprising agitating the pelletized phenolic ablative material prior to compressing said pelletized phenolic ablative material into said honeycomb core.

6. The method of claim 4, wherein said pelletized phenolic ablative material is compressed into said honeycomb core by at least one of:
 a vacuum bag molding process; and
 a mechanical press.

7. The method of claim 1, wherein compressing said phenolic ablative material into a honeycomb core comprises compressing said phenolic ablative material into a honeycomb core that has been surface treated by a plasma field to prepare a surface of the honeycomb core for receiving said phenolic ablative material.

8. The method of claim 7, further comprising using an adhesive to secure the plasma treated surface of the honeycomb core to a carrier structure.

9. The method of claim 1, wherein prior to compressing said phenolic ablative material into said honeycomb core said phenolic ablative material is:
 distributed into a tool to force said phenolic ablative material to assume a shape of a desired preform;
 placed under a vacuum pressure;
 frozen to produce a frozen preform; and
 the frozen preform removed from the tool and stacked on said honeycomb core; and the frozen preform thawed and compressed under pressure into a plurality of cells of the honeycomb core.

10. The method of claim 9, wherein compressing said phenolic ablative material into a honeycomb core comprises compressing said phenolic ablative material into a honeycomb core formed from a leno fabric, such that said phenolic ablative material forms an integral portion of said honeycomb core.

11. The method of claim 1, further comprising:
 using an additional layer of phenolic ablative material that differs in its density from the phenolic ablative material;
 simultaneously compressing said phenolic ablative material and additional layer of phenolic ablative material into said honeycomb core; and
 simultaneously curing said phenolic ablative material and said additional layer of phenolic ablative material with said honeycomb core.

12. A method of forming a heat shield, comprising:
 providing a plurality of phenolic microspheres;
 mixing said phenolic microspheres with a phenolic resin to form a phenolic ablative material;
 forcing said phenolic ablative material through a mesh screen to create a pelletized phenolic ablative material;
 forming a honeycomb core having a plurality of intersecting walls that form a plurality of cells arranged in rows and columns;
 securing the honeycomb core via an adhesive to a carrier structure;
 further forming the honeycomb core such that each said cell has a slot formed at an edge surface thereof along a first side of the honeycomb core, the slots allowing the escape of ambient air within each of the cells while the pelletized phenolic ablative material is being forced into the cells of the honeycomb core from a second side of the honeycomb core opposite to the first side;
 compressing said pelletized phenolic ablative material into the cells of the honeycomb core from the second side of the honeycomb core, after the honeycomb core has been secured to the carrier structure via the adhesive; and
 allowing the pelletized phenolic ablative material to cure.

13. A method of forming a heat shield, comprising:
 providing a plurality of phenolic microspheres;
 mixing said phenolic microspheres with a phenolic resin to form a phenolic ablative material;
 allowing the phenolic ablative material to cure;
 distributing said phenolic ablative material into a tool to force said phenolic ablative material to assume a shape of a desired preform;
 placing said phenolic ablative material under a vacuum pressure;
 freezing said phenolic ablative material to produce a frozen preform;
 forming a honeycomb core having a plurality of intersecting walls that form a plurality of cells arranged in rows and columns;
 further forming the honeycomb core such that each said cell has a slot formed at an edge surface thereof along a first side of the honeycomb core to allow the escape of ambient air within each of the cells once the first side of the honeycomb core is placed against a carrier structure to which the honeycomb core is being permanently bonded, and the cells are being filled with material from the frozen preform from a second side of the honeycomb core opposite to the first side;
 removing the frozen preform from the tool and stacking the frozen preform on the second side of said honeycomb core;
 thawing and compressing the frozen preform under pressure into the plurality of cells of the honeycomb core, from the second side of the honeycomb core, while the honeycomb core is secured to the carrier structure;
 allowing the phenolic ablative material to cure; and
 wherein compressing said frozen preform into the honeycomb core comprises compressing said frozen preform into a honeycomb core formed from a leno fabric, such that said the phenolic ablative material of the frozen preform forms an integral portion of said honeycomb core.

* * * * *